Figure 1:
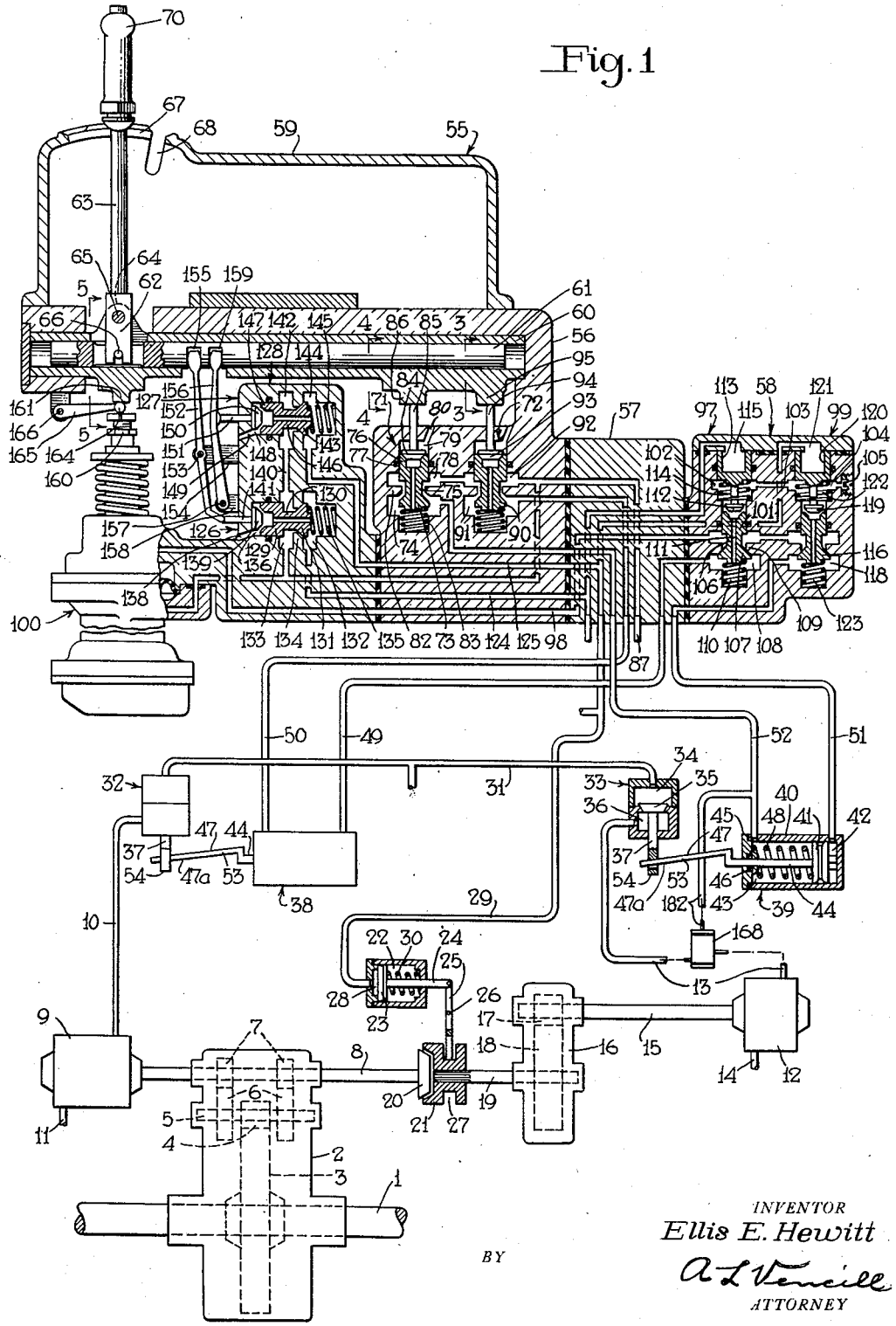

June 20, 1950          E. E. HEWITT          2,512,021

TURBINE CONTROL APPARATUS

Filed Dec. 12, 1945          2 Sheets-Sheet 2

INVENTOR
Ellis E. Hewitt
BY
A. L. Vencill
ATTORNEY

Patented June 20, 1950

2,512,021

UNITED STATES PATENT OFFICE 2,512,021

TURBINE CONTROL APPARATUS

Ellis E. Hewitt, Edgewood, Pa., assignor to The Westinghouse Air Brake Company, Wilmerding, Pa., a corporation of Pennsylvania Application December 12, 1945, Serial No. 634,496

5 Claims. (Cl. 137—158)

This invention relates to turbine control apparatus and more particularly to apparatus for controlling the supply of motive power to and its cut off from a plurality of turbines.

In the copending application of Harry C. May, Serial No. 550,691, filed August 23, 1944, now Patent No. 2,501,729, granted March 28, 1950, and assigned to the assignee of the present application, there is disclosed a control apparauts for selectively controlling the operation of a forward drive steam turbine and of a reverse drive steam turbine of a locomotive for railway service. The forward turbine is permanently connected to the locomotive drive wheels, but a clutch is employed for connecting the reverse turbine to the drive wheels when it is desired to propel the locomotive rearwardly, and to disconnect the reverse turbine from the drive wheels when the locomotive is propelled forwardly.

A forward throttle valve is used for controlling the supply of steam to and is cut off from the forward turbine, and a reverse throttle valve is employed for controlling the supply of steam to and is cut off from the reverse turbine. An operator's control device is operable selectively either to effect operation of the forward throttle valve to supply steam to the forward turbine and at the same time effect operation of the reverse throttle valve to cut off the supply of steam to the reverse turbine and also effect operation of the clutch to disconnect the reverse turbine from the locomotive drive wheels, or to effect operation of the forward throttle valve to cut off the supply of steam to the forward turbine and at the same time effect operation of the clutch to connect the reverse turbine to the drive wheels and also effect operation of the reverse throttle valve to supply steam to drive the reverse turbine.

Provision is made in the above described apparatus to cause full closing of both the forward and reverse throttle valves for cutting off the supply of steam to the respective turbines, when such is desired, but particularly where the throttle valves are of the poppet type they may be undesirably held open to a greater or less degree by foreign matter, such as a piece of pipe scale on the seat, in which event leakage of steam to the respective turbine will occur at a time when it is desired that no steam be supplied to the turbine. Slight leakage of steam to the forward turbine is however not too detrimental, but leakage to the reverse turbine is objectionable for it will tend to cause continuous and unnecessary rotation of the reverse turbine rotor when disconnected from the drive wheels, and if such leakage is sufficient said rotor might even be caused to spin at such a speed as to damage the turbine. Still further, if the operator desired to propel the locomotive rearwardly and engaged the reverse turbine clutch when the rotor in the reverse turbine was turning under the influence of steam leaking through the reverse throttle valve, the clutch and even the turbine or other parts of the locomotive might be severely damaged.

The principal object of the present invention is, therefore, the provision of means for insuring that steam will not be supplied to the reverse turbine when not desired.

Other objects and advantages will be apparent from the following more detailed description of the invention.

Figure 2:
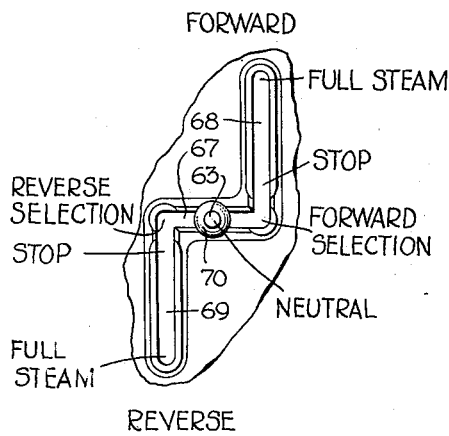
Figure 6:
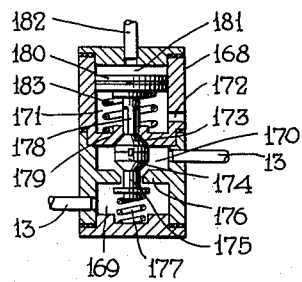
Figure 3:
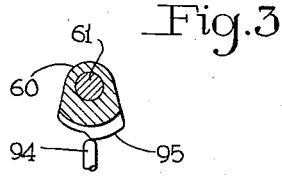
Figure 5:
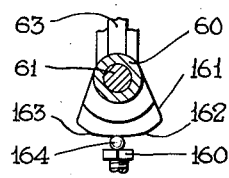
Figure 4:
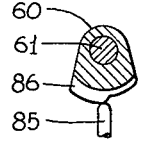

In the accompanying drawings; Fig. 1 is a diagrammatic view, partly in section and partly in outline, of a control apparatus embodying the invention; Fig. 2 is a partial plan view of an operator's control device shown in section in Fig. 1; Figs. 3, 4 and 5 are sectional views taken on lines 3—3, 4—4, and 5—5 on the operator's control device in Fig. 1; and Fig. 6 is a vertical cross-sectional view of an interlock valve device shown in side elevation in Fig. 1.

Description

In the drawings, the reference numeral 1 indicates a drive axle of a rail locomotive. A reduction gear housing 2 is mounted on axle 1 and contains a driving gear wheel 3 secured to the axle 1 for turning same. The gear wheel 3 is arranged to be operated by a smaller gear wheel 4 mounted on a jack shaft 5 which is journaled in the housing 2. The shaft 5 is arranged to be driven by gear wheels 6 which mesh with smaller driving gear wheels 7 mounted on and arranged to be driven by a shaft 8 having bearings in the housing 2 and extending out from either side thereof.

One end of shaft 8 is permanently connected to a forward steam turbine 9 which is arranged to be operated by steam supplied through a pipe 10 for driving axle 1 to propel the locomotive in a forward direction. Numeral 11 indicates an exhaust pipe from the turbine 9.

A reverse turbine 12 arranged to be operated by steam supplied through a pipe 13 and having a steam exhaust pipe 14 is adapted to drive a shaft 15. The shaft 15 extends into a reduction gear housing 16 containing meshing gear wheels 17 and 18, the gear wheel 17 being secured to said shaft and the gear wheel 18 being secured to a shaft 19 which is journaled in said housing in coaxial relation with shaft 8 connected to the forward turbine 9. A fixed clutch element 20 is rigidly secured to shaft 8 to rotate therewith, and slidably mounted on the adjacent end of shaft 19 is a movable clutch element 21 arranged to cooperate with the fixed clutch element 20 to operatively connect the reverse turbine 12 to the shaft 8 for driving the axle 1.

It will be noted that the forward turbine 9 is at all times connected to the locomotive axle 1 while the reverse turbine may be either connected or disconnected by the clutch 20, 21. Thus when the reverse turbine 12 is employed for driving the locomotive the rotor (not shown) of the forward turbine will also be operated, but the clutch 20, 21 provides for disconnecting the reverse turbine 12 from the drive shaft 8 when the engine is being driven by the forward turbine 9.

For operating the clutch element 21 to connect and disconnect the reverse turbine 12 to and from the drive shaft 8 there is provided a fluid pressure controlled motor comprising a cylinder 22 containing a piston 23 which is operatively connected through a rod 24 to one end of a lever 25. This lever is arranged to rock about a fixed fulcrum 26 provided intermediate its ends. The opposite end of lever 25 is in the form of a yoke straddling the movable clutch element 21 and has operating engagement therewith within an annular groove 27. At one side of piston 23 is a pressure chamber 28 which is arranged to receive fluid under pressure from a clutch control pipe 29 for actuating said piston to rock the lever 25 in a clockwise direction to urge the movable clutch element 21 into driving engagement with the fixed clutch element 20 to thereby operatively connect the reverse turbine 12 to the drive shaft 8. At the opposite side of piston 23 is a non-pressure chamber containing a spring 30 which functions to move the piston 23 to the position in which it is shown in the drawing upon release of fluid under pressure from pipe 29 and chamber 28 for disengaging the movable clutch element 21 from the fixed clutch element 20 to thereby disconnect the reverse turbine 12 from the drive shaft 8.

The reference numeral 31 indicates a steam supply pipe for conveying steam from the locomotive boiler (not shown) to a forward steam throttle valve 32 and a reverse steam throttle valve 33 which are provided for controlling or regulating the steam supply to respectively, the forward and reverse turbines 9 and 12.

The reverse steam throttle valve 33 may comprise a casing having a chamber 34 open to the steam supply pipe 31 and containing a poppet valve 35 for controlling flow of steam from said chamber to a chamber 36 which is connected to pipe 13. The valve 35 has an operating stem 37 extending to the exterior of the casing. The valve 35 is shown in the closed position for preventing supply of steam to pipe 13 and thus to the reverse turbine 12 and is constantly urged toward this position by the pressure of supply steam in chamber 34. By operating stem 37 the valve 35 may be unseated to supply steam from pipe 31 to the reverse turbine 12, it being apparent that the amount of steam supplied to said turbine may be varied in accordance with the degree of opening or unseating of said valve.

The forward throttle valve 32 for regulating the supply of steam from the supply pipe 31 to pipe 10 and thence to the forward turbine 9 may be structurally identical to the reverse throttle valve 33.

Fluid pressure controlled throttle adjusting motors 38 and 39 are provided for controlling opening and closing of the poppet valves 35 in the forward and reverse throttle valves 32 and 33, respectively. These motors may be like those fully disclosed in the copending application hereinbefore referred to, but with a view to simplicity in the present application, each of said motors may comprise, for illustrative purposes only, a casing 40 containing a piston 41 having at one side a pressure chamber 42 and at the opposite side a pressure chamber 43. The piston 41 is provided with a rod 44 extending through chamber 43 and a bore in a cover 45 which closes one end of said chamber. A packing 46 in cover 45 engages the peripheral surface of rod 44 for preventing leakage of fluid under pressure from chamber 43 along said rod to atmosphere.

The piston rod 44 is arranged at right angles to the axis to the respective poppet valve stem 37 and is connected to a cam member 53 having on one side an inclined surface 47 for engaging the end of said stem to unseat the valve 35 upon movement of piston 41 in the direction of the left hand, as viewed in the drawing. This inclined surface is so arranged that when piston 41 is at the right hand end of the casing, as shown in the drawing, the valve 35 will be seated and the degree of opening of said valve by the inclined surface is so arranged that when piston steam supplied from the steam supply pipe 31 to the respective turbine 9 or 12, will vary according to the extent of movement of said piston from said position in the direction of the left hand. When chamber 43 is open to atmosphere, piston 41 is adapted to be moved against the opposing pressure of a spring 48 by fluid under pressure supplied to chamber 42 in a manner which will be later described, for opening the respective poppet valve 35, while upon release of fluid under pressure from chamber 42 spring 48 is adapted to move said piston to the position shown in the drawing to permit closing of said valve. Fluid under pressure is also adapted to be supplied to chamber 43 for insuring movement of piston 41 to its valve closing position in case the spring 48 should become broken, in order to insure that the respective poppet valve 35 may become fully seated to prevent leakage of steam to the respective turbine 9 or 12. The cam member 53 may also have a surface 47a parallel to the surface 47, and the end of the valve stem 37 may be in the form of a stirrup having a portion 54 disposed below said member for engagement by surface 47a to move valve 35 from a fully open or substantially fully open position toward its closed position upon movement of piston 41 by spring 48. When the supply valve 35 is closed and piston 41 is in the position in which it is shown in Fig. 1 of the drawing there will be clearance between surface 47a and the portion 54 of the stirrup in accordance with conventional practice.

In the forward throttle adjusting motor 38 chamber 42 is connected to a forward speed control pipe 49 and chamber 43 is connected to a pipe 50, while in the reverse throttle adjusting motor 39 chamber 42 is connected to a reverse speed control pipe 51 and chamber 43 is connected to a pipe 52.

Selective control of the forward and reverse throttle adjusting motors 38 and 39, and thereby selective control of the supply of steam to the forward and reverse turbines 9 and 12, respectively, in accordance with the desired direction of movement of the locomotive, is arranged to be controlled by an operator's control valve device 55.

The operator's control device 55 comprises a body portion 56 which is mounted on one face of a pipe bracket 57, a throttle adjusting motor selector valve portion 58 mounted on another face of said bracket, and a cover 59 mounted on the body portion 56.

The body portion 56 carries a hollow rock shaft 60 suitably journaled at opposite ends and secured against longitudinal movement, and mounted to slide within said rock shaft longitudinally thereof is a plunger 61. Adjacent one end, the rock shaft 60 is provided through one side with a slot, and the plunger 61 has a through slot which is in alignment with the slot in the shaft 60, and extending through said slot in the rock shaft and into said slot in said plunger is an end portion 62 of an operator's control lever 63. The rock shaft 60 is provided at either side of its slot with spaced upstanding ears 64 between which the portion 62 of the operator's control lever is disposed. Extending through the ears 64 and through the interposed portion of control lever 63 is a pivot pin 65 for said lever, said pin being arranged at right angles to the axis of the rock shaft 60. In the inner end of the portion 62 of the operator's control lever is a recess in which is disposed a pin 66 which is secured to plunger 61. By this structure it will be seen that movement of the operator's control lever 63 about pin 65 in the direction of the length of rock shaft 60 will move the plunger 61 longitudinally in said shaft, while movement of said lever in a direction circumferentially of said shaft will turn said shaft and plunger in unison.

The cover 59 is provided with a slot through which the operator's control lever 63 extends and which is adapted to define a path of movement for said lever. This slot comprises a central portion 67 which extends parallel to the direction of length of the rock shaft 60, and oppositely extending portions 68 and 69 which are arranged at right angles to the central portion 67 and which open respectively to opposite ends of said central portion.

The operator's control lever 63 has a "neutral" position midway between the ends of the central portion 67 of the slot, in which position said lever is shown in Figs. 1 and 2 of the drawings. The lever 67 is movable in one direction from "neutral" position to what may be called a "forward selection" position at the junction of the portions 67 and 68 of the slot and then to a "stop" position, a slight distance into the portion 68 of the slot from the "forward selection" position. At the opposite or outer end of the portion 68 of the slot, the lever 67 has a "full steam" position, the range of movement of said lever between the "stop" position and the "full steam" position constituting a speed control range or zone for varying the supply of steam to the forward turbine 9 from, respectively, a minimum amount to a maximum amount in a manner which will be later described. The minimum amount just mentioned is less than required to cause operation of the forward turbine 9 to propel the locomotive and is substantially equal to the steam slip in the turbine so as to maintain the turbine warm when the locomotive is stopped in order that said turbine will be in condition to operate efficiently when required for propulsion.

The lever 63 has at the opposite end of the portion 67 of the slot a "reverse selection" position and in the portion 69 of the slot "stop" and "full steam" positions for controlling the reverse turbine 12, the space between said "stop" and "full steam" positions constituting a speed varying range for said turbine, and the "stop" position also providing for supply of steam to the reverse turbine equal substantially to the turbine slip for the same reason as above set forth in connection with turbine 9. In portion 67 of the slot all steam to the turbines is adapted to be cut off, as will be described in greater detail, hereinafter.

These different positions of lever 63 are indicated in Fig. 2 of the drawings by appropriate legends, and there are also shown the legend "forward" at the remote end of the portion 68 of the slot and the legend "reverse" at the opposite end of the portion 69 of the slot, the last two mentioned legends indicating the directions of movement of lever 63 from "neutral" position for obtaining ahead or reverse operation of the locomotive.

As shown in Fig. 1 of the drawings, the operator's control lever 63 is contained within the cover 59 and extends into the slot above mentioned where it is connected to a hand grip 70 provided for the operator to take hold of to move said lever to its different positions.

Associated with the body portion 56 of the operator's control valve device is a reverse steam cut off valve device 71 and a forward steam cut off valve device 72.

The reverse steam cut off valve device 71 comprises a supply valve 73 contained in a chamber 74 and connected by a stem 75 to a plunger 76 slidably mounted in a suitable bore in the casing. The casing has an annular recess encircling the plunger 76 and containing a sealing ring 77 for preventing leakage of fluid under pressure from a chamber 78 to a chamber 79, the latter chamber being open to atmosphere through a port 80. A wall 82 separates chamber 74 from chamber 78 and the stem 75 loosely extends through an opening in said wall which in chamber 74 is provided with a seat around said opening for engagement by valve 73. A spring 83 in chamber 74 acts on the supply valve 73 for urging it into contact with its seat. The supply valve 73, stem 75 and plunger 76 are provided with an axial bore which is open at one end to chamber 74 and which is open through a valve seat at the opposite end to chamber 79 which contains a release valve 84 arranged to cooperate with said seat for controlling release of fluid under pressure from chamber 74 to chamber 79. The release valve 84 is carried by a stem 85 which is disposed directly below the axis of rock shaft 60.

The rock shaft 60 is provided with a cam 86 arranged to contact the release valve stem 85. The cam 86 is so designed as to effect movement of valve 84 into contact with its seat and to then act through plunger 76 and stem 75 to move the supply valve 73 out of engagement with its seat, when the operator's control lever 63 is disposed in the portions 67 and 68 of the slot, and to permit closing of said supply valve by spring 83 and opening of the release valve 84 by pressure of fluid from chamber 74 when the operator's control lever is in any position between and including "stop" and "full steam" positions in the portion 69 of the slot.

Chamber 78 is arranged to be constantly supplied with fluid under pressure from a fluid pressure supply pipe 87 while the locomotive is in use. Chamber 74 is connected to pipe 52 which leads to spring chamber 43 in the reverse throttle adjusting motor 39. It will thus be seen that when the operator's control lever 63 is in any position between and including the "stop" and "full steam" positions in the portion 69 of the slot, which provides for control of the reverse throttle adjusting motor 39 in a manner which will be later described, the spring chamber 43 in said motor will be open to atmosphere past the release valve 84 to provide for operation of said motor by fluid under pressure supplied to chamber 42 for controlling the steam supply to the reverse turbine 12, while in all positions of said lever, fluid under pressure will be supplied to spring chamber 43 in the reverse throttle adjusting motor 39 to cause operation thereof to permit closing of valve 35 in the reverse throttle valve 33 to cut off the supply of steam to the reverse turbine.

The forward steam cut-off valve device 72 is structurally identical to the reverse steam cut-off valve device 71 and, briefly, comprises a supply valve 90 contained in a chamber 91 which is connected to pipe 50 leading to spring chamber 43 in the forward throttle adjusting motor 38. The valve 90 is arranged to control supply of fluid under pressure from a chamber 92 to chamber 91, the chamber 92 being constantly supplied with fluid under pressure from the supply pipe 87. The forward steam cut-off valve device further comprises a release valve 93 and an operating stem 94 arranged to cooperate with a cam 95 on the rock shaft 60. The cam 95 is formed just the reverse of cam 86 so that with the operator's control lever 63 in the forward speed control zone, that is to say, in and between the "stop" and "full steam" positions in the portion 68 of the slot, the spring chamber 43 in the forward throttle adjusting motor 38 will be open to atmosphere past the release valve 93 to provide for adjustment of said motor by pressure of fluid in chamber 42, while in all other positions of the operator's control lever the forward steam cut-off valve device 72 will act to supply fluid under pressure to spring chamber 43 in the forward throttle adjusting motor 38 to insure operation thereof to permit closing of the steam supply valve 35 in the forward throttle valve 32 to cut off the supply of steam to the forward turbine 9.

The forward and reverse cut-off valve devices 71 and 72 will thus act to insure operation of the forward and reverse throttle adjusting motors 38 and 39 to permit closing of the respective steam supply valves 35 for cutting off the supply of steam to the turbines when the controlling lever is in the central portion 67 of the slot, and will insure operation of the reverse throttle adjusting motor 39 to permit closing of the respective throttle valve 35 when the operator's control lever is positioned for supplying steam to the forward turbine 9, and will also insure operation of the forward throttle adjusting motor 38 to permit closing of the respective throttle valve 35 when the operator's control lever is positioned for supplying steam to the reverse turbine.

The throttle adjusting motor selector valve portion 53 of the operator's control valve device 55 comprises a forward selector valve device 97 for controlling communication between pipe 49 from the forward throttle adjusting motor 38 and a passage 98, and also comprises a reverse selector valve device 99 for controlling communication between said passage and pipe 51 leading to the reverse throttle adjusting motor 39. The passage 98 leads to a self-lapping speed control valve device 100 also forming a part of the operator's control valve device 55.

The forward selector valve device 97 comprises a plunger 101 slidably mounted in a suitable bore in the casing and having at one side a chamber 102 which is open to atmosphere through a passage 103, a chamber 104 and an insect excluding device 105. The plunger 101 is connected by a stem 106 to a fluid pressure supply valve 107 which is contained in a chamber 108, said stem extending through an opening in a wall 109 separating said chambers. In chamber 108 the wall 109 is provided with a seat which extends around the opening therein for engagement by the supply valve 107. A spring 110 in chamber 108 acts on the valve 107 for urging said valve to its closed position in which it is shown in the drawing.

The valve 107, stem 106 and plunger 101 are provided with an axial bore 111 open at one end to chamber 108 and open at the opposite end to chamber 102. In chamber 102 the plunger 101 is provided with a seat which extends around the bore 111 for engagement by a release valve 112 contained in said chamber. Located above the release valve 112 is a plunger 113 which is slidably mounted in the casing in coaxial relation with said valve and with plunger 101. The plunger 113 is subject on its lower face to pressure of fluid in chamber 102 plus the pressure of a spring 114, and is open at its upper face to a chamber 115.

When fluid under pressure is supplied to chamber 115, in a manner which will be later described, the plunger 113 will move against the opposing force of spring 114 to first seat the release valve 112 against the plunger 101 for closing communication between chamber 102 and chamber 108. Further movement of plunger 113 by fluid pressure in chamber 115 will then act through the release valve 112 and plunger 101 to unseat the supply valve 107 for opening communication between passage 98 and chamber 108 which is connected through pipe 49 to piston chamber 42 in the forward throttle adjusting motor 38. Upon release of fluid under pressure from chamber 115 spring 114 will return plunger 113 to the position in which it is shown in the drawing to allow closing of the supply valve 107 by spring 110 and opening of the release valve 112 by pressure of fluid in bore 111 for connecting chamber 108 and thereby chamber 42 in the forward throttle adjusting motor 38 to atmosphere.

The reverse throttle selector valve device 99 is structurally identical to the forward throttle selector valve device 97 and briefly, comprises a supply valve 116 for controlling flow of fluid under pressure from passage 98 to a chamber 118 which is connected to pipe 51 leading to chamber 42 in the reverse throttle adjusting motor 39. The reverse throttle selector valve device 99 further comprises a release valve 119, contained in chamber 104, for releasing fluid under pressure from chamber 42 in the reverse throttle adjusting motor. The device also comprises a plunger 120 arranged to operate in response to supply of fluid under pressure to a chamber 121 to close the release valve 119 and to open the supply valve 116. Upon release of fluid under pressure from chamber 121 a spring 122 will return plunger 120 to the position in which it is shown in the drawing to permit closing of the supply valve 116 by a spring 123 and opening of the release valve 119 by pressure of fluid from chamber 118, so as to thereby open pipe 51 and pressure chamber 42 in the reverse throttle adjusting motor 39 to atmosphere.

The plunger chamber 115 in the forward selector valve device 97 is connected to a passage 124, and the plunger chamber 121 in the reverse selector device 99 is connected to a passage 125. The passages 124 and 125 lead respectively to forward and reverse directional control valve devices 126 and 127 provided in a direction selector portion 128 of the operator's control valve device 55.

The forward directional control valve device 126 comprises a plunger 129 slidably mounted in a bore in the casing and connected by a stem 130 to a supply valve 131 contained in a chamber 132. The stem 130 extends through a chamber 133 formed at one side of plunger 129 and also through a bore provided in a wall 134 which separates said chamber from chamber 132, said wall being provided around said bore in chamber 132 with a seat for engagement by the valve 131. A spring 135 in chamber 132 acts on the supply valve for urging it to its seat. The supply valve 131, stem 130 and plunger 129 are provided with an axial bore open at one end to chamber 132 and open at the opposite end through a valve seat to a chamber 136 which is open to atmosphere through a port 138. A release valve 139 contained in chamber 136 is provided to engage a seat on the end of plunger 129 for closing communication through the bore in said plunger. Chamber 133 is open to the fluid pressure supply pipe 87 and thus adapted to be constantly supplied with fluid under pressure. Chamber 132 is connected to passage 124 leading to plunger chamber 115 in the forward throttle selector valve device 97. The release valve 139 is provided with a stem 141 which is slidably mounted in the casing and which extends beyond an exterior surface thereof.

The reverse directional control valve device 127 is structurally identical to the forward directional control valve device 126 and, briefly, comprises a supply valve 143 contained in a chamber 144 and which is arranged to be seated by the pressure of a spring 145. The supply valve 144 is connected by a stem 146 extending through a chamber 142 to a plunger 147 at the outer face of which is a chamber 148 which is open to atmosphere through a port 149. A release valve 150 contained in chamber 148 is arranged to cooperate with a seat provided on the adjacent end of plunger 147 for controlling release of fluid under pressure from chamber 144 to atmosphere by way of chamber 148. The release valve 150 has a stem 151 extending through a bore in the casing and beyond an exterior surface thereof. The chamber 142 is adapted to be constantly supplied with fluid under pressure from the fluid pressure supply pipe 87 through chamber 133 and a passage 140. Chamber 144 is connected to passage 125 leading to plunger chamber 121 in the reverse throttle selector valve device 99.

The two release valve stems 151 and 141 are arranged in spaced parallel relation with respect to each other and to the axis of plunger 61 which is mounted to slide in the rock shaft 60. The release valve stem 141 is engaged by one end of a lever 152 which substantially midway between its ends is fulcrumed on a pin 153 mounted on a bracket 154 projecting from the casing of the device. The opposite end of lever 152 is disposed in a recess 155 provided in plunger 61, so that longitudinal movement of said plunger will rock the lever 152 about the fulcrum pin 153. The release valve stem 151 is engaged by a lever 156 substantially midway of its length. One end of lever 156 is fulcrumed on a pin 157 provided in a bracket 158 projecting from the casing, while the opposite end is disposed in a recess 159 provided in plunger 61, so as to move with said plunger upon longitudinal movement thereof.

With the operator's control lever 63 in "neutral" position, as shown in Figs. 1 and 2 of the drawings, the levers 152 and 156 will be positioned to permit opening of the release valves 139 and 150 and closing of the supply valves 131 and 143 so as to thereby release fluid under pressure from plunger chambers 115 and 121 in the forward and reverse throttle selector valve devices 97 and 99, respectively. The release valves 112 and 119 in the latter devices will therefore be open and the supply valves 107 and 116 will be closed, so that piston chambers 42 in the forward and reverse throttle adjusting motors 38 and 39, respectively, will be open to atmosphere. Thus with the operator's control lever 63 in "neutral" position, pistons 41 in the forward and reverse throttle adjusting motors 38 and 39 will be positioned by springs 46 as shown in the drawing to permit closing of poppet valves 35 in the forward and reverse throttle valves 32 and 33 for cutting off supply of steam to the forward and reverse turbines 9 and 12, respectively.

The operator's control lever 63 when moved to the position designated by the legend "forward selection" in Fig. 2 will move plunger 61 longitudinally in the direction of the left hand (Fig. 1) to thereby actuate lever 152 to close the release valve 139 and open the supply valve 131 in the forward directional control valve device 126. Thus in this position of the operator's control lever fluid under pressure will be supplied from the supply pipe 87 to passage 124 and thence to plunger chamber 115 in the forward throttle selector valve device 97 to thereby actuate said device to establish communication between passage 98 and pipe 49 leading to the forward throttle control motor 38. In this "forward selection" position of the operator's control lever 63 it will be noted that the parts of the reverse directional control valve device 127 will remain in the positions in which they are shown in Fig. 1 for opening plunger chamber 121 in the reverse throttle selector valve device 99 to atmosphere, so that the latter device will remain in the condition opening to atmosphere pipe 51 leading to the reverse throttle adjusting motor in order that said motor will be conditioned to permit cutting off of the supply of steam to the reverse turbine 12.

The condition just described of the forward and reverse directional control valve devices 126 and 127 is obtained in the "forward selection" position of the operator's control lever and is then maintained as long as lever is at this side of "neutral" position and consequently during adjustment of said lever in the portion 68 of the lever guide slot.

If the operator's control lever 63 is moved from "neutral" position to the position indicated by that legend "reverse selection" in Fig. 3, the plunger 61 will be moved longitudinally in the direction of the right hand to actuate lever 156 for closing release valve 150 and opening the supply valve 143 in the reverse directional control valve device 127, while allowing the parts of the forward directional control valve device 126 to remain in the positions in which they are shown in Fig. 1. As a result, fluid under pressure will be supplied from passage 140 to passage 125 and thence to plunger chamber 121 in the reverse throttle selector valve device 99 for operating said device to open communication between pipe 98 and pipe 51 leading to the reverse throttle adjusting motor 39. Under this condition the parts of the forward throttle selector valve device 97 will remain in the position in which they are shown in the drawings for opening pipe 49 and thereby chamber 42 in the forward throttle adjusting motor 38 to atmosphere. This condition of the forward and reverse directional control devices 126 and 127 will be maintained as long as the operator's control lever 63 is at the left hand side of "neutral" position, as viewed in Fig. 2, and therefore during adjustment of said lever in the portion 69 of the guide slot.

The self-lapping valve device 100 may be of any suitable type arranged to supply fluid at various degrees of pressure from a chosen minimum pressure to a certain maximum degree. For illustration, the self-lapping valve device may be of the type comprising a control plunger 160 and valve means (not shown) controlled by longitudinal movement of said plunger for providing in passage 98 fluid at a pressure proportional to the degree of movement or displacement of said plunger from a normal position in which it is shown in Fig. 1 of the drawing, and operable in said normal position to reduce the pressure of fluid in passage 98 to a chosen minimum degree such as atmospheric pressure. Fluid under pressure for supply to passage 98 by operation of the self-lapping valve device 100 is provided through the fluid pressure supply pipe 87.

For controlling displacement of plunger 160 from its normal position, the rock shaft 60 is provided with a cam 161 having two identical but reversely arranged and spaced apart cam portions 162 and 163 on the peripheral surface of the cam. The peripheral surface of the cam is operatively connected to plunger 160 through a ball like end 164 of an arm 165 the opposite end of which is mounted to rock on a pin 166 provided in the casing.

With the operator's control lever 63 in "neutral" position and in both the "forward selection" and "reverse selection" positions, the cam 161 provides for movement of the plunger 160 to its outermost or normal position in which the self-lapping valve device 100 will operate to open passage 98 to atmosphere. Movement of the operator's control lever to either "stop" position is adapted to cause operation of cam 161 to effect operation of the self-lapping valve device 100 to supply fluid at a chosen pressure, such as 10 pounds, to passage 98, which pressure effective in piston chamber 42 of the forward or reverse throttle adjusting motor 38 or 39, as the case may be and as will be later described, will actuate said motor and thereby the respective throttle valve 32 or 33 to supply the hereinbefore mentioned minimum amount of steam to the respective turbine 9 or 12.

The operator's control lever 63 when moved in the portion 68 of the slot from "stop" position to the "full steam" position will cause operation of cam 161 to effect displacement of plunger 160 into the self-lapping valve device 100 an amount proportional to the extent of movement away from "stop" position to thereby provide in passage 98 fluid at a proportional pressure. A maximum pressure of fluid such as 65 pounds will be obtained in passage 98 upon movement of the operator's control lever in portion 68 of the slot to the "full steam" position. Adjustment of the operator's control lever in the reverse direction in the portion 68 of the slot will cause the pressure in passage 98 to reduce in proportion to the distance the lever is out of the "stop" position, while return of said lever to the "forward selection" position will cause operation of the self-lapping valve device 100 to reduce the pressure of fluid in passage 98 to atmospheric pressure as above mentioned.

In a like manner the pressure of fluid in passage 98 will be varied in accordance with adjustment of the operator's control lever 63 in the portion 69 of the slot, as will be apparent.

The overall operation of the apparatus as so far described will now be set forth.

Let it be initially assumed that the operator's control lever 137 is in "neutral" position effecting operation of the forward and reverse directional control valve devices 126 and 127 to open the plunger chambers 115 and 121 in the forward and reverse throttle selector valve devices 97 and 99 to atmosphere. The forward and reverse throttle selector valve devices 97 and 99 will thus be conditioned to open pipes 49 and 51 and thereby piston chambers 42 in the forward and reverse throttle adjusting motors 38 and 39 to atmosphere to permit movement of the throttle adjusting pistons 41 by springs 48 to their steam cut off position to permit closing of the steam supply valves 35 in the forward and reverse throttle valves 32 and 33 for preventing supply of steam to the forward and reverse turbines 9 and 12, so that the locomotive may be stopped.

Further, with the operator's control lever 63 in "neutral" position the forward and reverse steam cut-off valve devices 72 and 71 will be conditioned for supplying fluid under pressure to pipes 50 and 52 leading to spring chambers 43 in the forward and reverse throttle adjusting motors 38 and 39, respectively, to insure that pistons 41 in said motors will be occupying their steam cut-off positions, as shown in Fig. 1 of the drawing.

Moreover, with the parts of the reverse directional control valve device 127 in the positions in which they are shown in the drawings pressure chamber 28 in the clutch control cylinder 22 will be open to atmosphere through pipe 29 and passage 125 to permit movement of piston 23 by spring 30 to disengage the movable element 21 of the clutch from the fixed element 20 so as to disconnect the reverse turbine 12 from the forward turbine drive shaft 8.

Now let it be assumed that forward movement of the locomotive is desired. To accomplish this the operator will move lever 63 from "neutral" position first to the "forward selection" position to thereby actuate the forward directional control valve device 126 to supply fluid under pressure to passage 124 and thence to plunger chamber 115 to operate the forward throttle selector valve device 97 to open communication between passage 98 from the self-lapping valve device 100 and pipe 49 leading to the forward throttle control motor 38. The operator will then move the control lever 63 from the "forward selection" position to "stop" position in the portion 68 of the slot to actuate the forward steam cut-off valve device 72 to release fluid under pressure from spring chamber 43 in the forward throttle adjusting motor 38. In the "stop" position just mentioned the control lever 63 will also actuate the self-lapping valve device 100 to supply fluid to passage 98 and thence through the forward throttle selector valve device 97 to pipe 49 and to piston chamber 42 in the forward throttle control motor 39 at the pressure, such as 10 pounds, sufficient to cause operation of said motor and thereby of the forward throttle valve 32 to supply steam to the forward turbine 9 in an amount insufficient to cause operation of said turbine but which will provide for heating thereof as hereinbefore described.

Movement of lever 63 past "stop" position in the direction of "full steam" position in portion 68 of the slot will then cause operation of the self-lapping valve device 100 and thereby of the forward throttle adjusting motor 38 and throttle valve 32 to increase the supply of steam to the forward turbine 9 in an amount proportional to the distance the lever is away from said "stop" position, to thereby cause operation of the forward turbine to turn the locomotive axle 1 and drive the locomotive in a forward direction. By proper adjustment of lever 63 in the portion 68 of the slot any desired amount of steam may be supplied to the forward turbine 9 as will be apparent from the above description. Return of lever 63 to "stop" position in the portion 68 of the slot will reduce the supply of steam to the forward turbine to the minimum amount which is insufficient for causing operation of the turbine as before mentioned.

It will thus be seen that by suitable adjustment of the operator's control lever in the portion 68 of the slot between the "stop" and "full steam" positions any desired degree of speed or output of power for the turbine 9 may be obtained for propelling the locomotive in a forward direction, it being noted that during this operation of the forward turbine 9 incident to the operator's control lever being at the "forward selection" side of "neutral" position the reverse turbine 12 is non-operaitve and disconnected from the locomotive axle since the reverse directional control valve device 127, the reverse throttle selector valve device 99, the reverse steam cut-off valve device 71 and thereby the reverse throttle adjusting motor 39 remain in the positions in which they are shown in the drawings.

In order to stop the locomotive from movement in the forward direction, the operator need only return lever 63 to "stop" position adjacent "forward selection" position to cut off the supply of propelling steam to the forward turbine 9, as will be apparent.

If the operator now desires to move the locomotive in the reverse direction he will move the control lever 63 to the "reverse selection" position for operating the reverse directional control valve device 127 to supply fluid under pressure to passage 125 and thence to plunger chamber 121 in the reverse throttle selector valve device 99 for actuating the latter device to connect pipe 51 from the reverse throttle adjusting motor 39 to passage 98 leading to the speed control valve device 100. Fluid under pressure supplied to passage 125 will also flow through pipe 29 to the clutch control cylinder 22 to actuate piston 23 therein to move clutch element 21 into driving engagement with the element 20 for connecting the reverse turbine 12 to drive shaft 8. The operator will then move lever 63 from the "reverse selection" position to "stop" position in the portion 69 of the guide slot and this movement will effect operation of the reverse steam cut-off valve device 71 to open spring chamber 43 in the reverse throttle adjusting motor 39 to atmosphere and at the same time will cause operation of the self-lapping valve device 100 to supply fluid to passage 98 and thence through the reverse throttle selector valve device 99 to piston chamber 42 in the reverse throttle adjusting motor 39 at a pressure to cause operation of said motor and thereby of the throttle valve 33 to supply steam to the reverse turbine 12 in an amount insufficient to cause operation of said turbine but sufficient for heating same, as before described. Suitable adjustment of lever 63 in the portion 69 of the slot between the "stop" and "full steam" positions will then cause operation of the reverse throttle adjusting motor 39 and reverse throttle valve 33 to supply any chosen amount of steam to the reverse turbine 12. When desired, the locomotive may be stopped by returning the operator's control lever 63 to the "stop" position for rendering the reverse turbine non-operative, as will be apparent from the previous description.

Return of the operator's control lever 63 to "neutral" position will effect operation of the directional control valve device 127 to open pipe 125 to atmosphere to permit release of fluid under pressure from piston chamber 28 in the clutch control cylinder 22 to render spring 30 effective to disengage the clutch elements 21 and 20, and at the same time will effect operation of the reverse throttle selector valve device 99 to open pipe 51 and thereby piston chamber 42 in the reverse throttle adjusting motor 39 to atmosphere. Also, in "neutral" position the reverse steam cut-off valve device 71 will be operated to supply fluid under pressure to spring chamber 43 in the reverse throttle adjusting motor 39 to insure movement of the piston 41 therein to the steam cut-off position to permit full closing of the steam supply valve 35 in the reverse throttle valve 33 for cutting off the supply of steam to the reverse turbine 12.

It is desired to point out that when the operator's control lever 63 is at the "reverse selection" side of "neutral" position, the parts of the forward directional control valve device 126, the forward steam cut-off valve device 72, the forward throttle selector valve device 97 and the forward throttle adjusting motor 38 will remain in the positions in which they are shown in the drawings for rendering the forward turbine 9 non-operative during operation of the reverse turbine 12 to propel the locomotive in reverse. However, since the forward turbine 9 is at all times connected to the locomotive axle 1, its rotor (not shown) will turn as the locomotive is driven by the reverse turbine 12, as hereinbefore mentioned.

The structure so far described is substantially the same as structure fully disclosed and described in the copending application hereinbefore referred to, and insofar as a clear understanding of the present invention is concerned no further description thereof, is considered essential herein. Summarizing however, it is desired to point out that by suitable operation of the operator's control lever 63, the forward and reverse turbines may be selectively caused to drive the locomotive. When the forward turbine 9 is driving, the clutch 20, 21 is operated to disconnect the reverse turbine 12 from the drive axle 1 and fluid under pressure is supplied to spring chamber 43 in the reverse throttle adjusting motor 39 to insure that piston 41 therein will occupy its steam cut-off position to permit full closure of the poppet valve 35 of the reverse throttle device 33 so as to prevent steam being supplied to the reverse turbine. On the other hand, when the reverse turbine 12 is driving the locomotive through the clutch 20, 21, fluid under pressure is supplied to spring chamber 43 in the forward throttle adjusting motor 38 to insure that piston 41 therein will occupy its steam cut-off position to permit full closure of the supply valve 35 in the forward throttle device 32 so as to prevent steam being supplied to the forward turbine. In other words, provision has been made to insure against supply of steam to the reverse turbine when the forward turbine is driving the locomotive, and to insure against supply of steam to the forward turbine when the reverse turbine is driving the locomotive.

However, if a particle of hard foreign matter such as pipe scale should become lodged on the seat of the poppet valve 35 or on the seating face of said valve when open, in either the forward throttle valve 32 or reverse throttle valve 33, such foreign matter might prevent closure of said valve and would therefore permit steam to leak to the respective turbine 9 or 12, when it is not desired. Such leakage to the reverse turbine is particularly objectionable for reasons hereinbefore described.

According to the invention an intercepting structure 168 is provided in the steam supply pipe 13 to the reverse turbine 12 for insuring that steam cannot be effective in said turbine in case of leakage of steam past the poppet valve 35 in the reverse throttle valve 33 under conditions when said valve should be closed, as when the engine is stopped or being driven forwardly by the reverse turbine 12.

The intercepting structure 168 (Fig. 6) comprises a casing having a chamber 169 connected to the portion of pipe 13 leading to chamber 36 in a reverse throttle valve 33, a chamber 170 connected to the portion of pipe 13 leading to the reverse turbine 12 and a chamber 171 which is open through a vent port 172 to atmosphere. In chamber 170 there are two oppositely seating poppet valves 173 and 174 which are arranged to move in unison. The valve 174 has a stem 175 loosely extending through an opening in a partition 176 separating chambers 169 and 170 and around said opening in chamber 170 is a seat provided for engagement by said valve. A spring 177 in chamber 169 acts on the valve stem 175 for urging the valve 174 to the open position shown in the drawing. The valve 173 has an oppositely arranged fluted stem 178 extending through an opening in a partition wall 179 into chamber 171, said wall being provided in chamber 170 around said opening with a seat for said valve.

In chamber 171 the valve stem 178 engages one side of a piston 180. At the opposite side of piston 180 is a chamber 181 which is connected to a pipe 182 leading to pipe 52 which is connected to spring chamber 43 in the reverse throttle adjusting motor 39. A spring 183 in chamber 171 acts on piston 180 for urging it to the position in which it is shown in Fig. 6 of the drawing when chamber 181 is open to atmosphere by way of pipes 182 and 52. Under this condition spring 177 will open valve 174 and close valve 173. When fluid is supplied to chamber 181 at a pressure sufficient to overcome the pressure of spring 183 on piston 180 said piston will be moved to open valve 173 and close valve 174.

When the locomotive is stopped or operating in a forwardly direction, under which condition the reverse steam cut-off valve device 71 will be operated to supply fluid under pressure to pipe 52 and thence to spring chamber 43 in the reverse throttle adjusting motor 39 to insure movement of piston 41 therein to its steam cut-off position, said fluid under pressure will also be effective in chamber 181 of the intercepting structure 168 to close valve 174 and to open valve 173. The closing of valve 174 will, in case of leakage of steam past the poppet valve 35 in the reverse throttle valve 33, prevent such steam from becoming effective in the reverse turbine 12, while opening of valve 173 will permit such steam to be dissipated to atmosphere, whereby the rotor of the reverse turbine 12 will be permitted to remain stationary under such a condition.

The valve 174 might be dispensed with if the venting capacity of valve 173 were sufficient to insure dissipation of steam leakage through the reverse throttle valve 33 to pipe 13 at a rate to prevent steam becoming effective in the reverse turbine 12 at a pressure sufficient to cause operation of said turbine. Moreover the valve 173 might even be dispensed with since the possibility of both valve 174 and of valve 35 in the reverse throttle valve 33 being held open by foreign matter at the same time is extremely remote and the closing of either one would accomplish the desired end of preventing leakage of steam to the reverse turbine. However, applicant prefers to use both of the valves 173 and 174.

When the operator's control valve device 55 is operated to cause movement of the locomotive by the reverse turbine 12 the reverse steam cut-off valve device 71 is operated to release fluid under pressure from spring chamber 43 in the reverse throttle adjusting motor 39 as hereinbefore described, and at the same time fluid under pressure will be released from chamber 181 in the intercepting valve structure 168. Spring 177 will thereby be rendered effective to close valve 173 and open valve 174 for opening communication through the steam supply pipe 13 to the reverse turbine 12 whereby said turbine will operate in response to the operation of the operator's control valve device, in the same manner as hereinbefore described.

*Summary*

It will now be seen that by the use of the intercepting valve device 168 in the steam supply pipe 13 leading to the reverse turbine 12, supply of steam to said turbine when not desired, as in case of leakage past the poppet valve 35 in the reverse throttle valve 33, is positively prevented, so that the rotor of said turbine will remain stationary when the locomotive is stopped or is operating in a forward direction and thus prevent unnecessary and useless operation of said rotor and possible damage thereto or to the clutch 20, 21 or the reduction gear 16, such as above described.

It will be readily apparent that an interlock device identical to the interlock device 168 and arranged for control from pipe 50 could be disposed in the steam supply pipe 10 to the forward turbine 9 to insure against leakage of steam to said turbine in case the poppet valve 35 of the forward throttle valve 32 did not fully close when intended, if such were desired.

Having now described the invention, what I claim as new and desire to secure by Letters Patent is:

1. A control apparatus for a steam turbine comprising a steam supply pipe for said turbine, steam supply valve means for supplying steam to and for cutting off the supply of steam to said pipe, other valve means for controlling communication through said pipe and for also dissipating steam leakage past said supply valve means, control means for effecting operation of said supply valve means to cut off the supply of steam to said pipe and for at the same time effecting operation of said other valve means to close said communication and to dissipate from said pipe steam leakage past said supply valve means, and for also effecting operation of said supply valve means to supply steam to said pipe and for at the same time effecting operation of said other valve means to open said communication and to prevent dissipation of steam, and an operator's control lever for controlling said control means.

2. A control apparatus for a steam turbine comprising, steam supply valve means for supplying steam to and for cutting off the supply of steam to said turbine, a fluid motor comprising power means for controlling said valve means and operable upon supply of fluid under pressure to one chamber when fluid under pressure is released from a second chamber to effect operation of said valve means to supply steam to said turbine and operable upon supply of fluid under pressure to said second chamber when fluid under pressure is released from said one chamber to effect operation of said valve means to cut off supply of steam to said turbine, control means for selectively supplying fluid under pressure to either one of said chambers and for at the same time releasing fluid under pressure from the other chamber, intercepting means operable by fluid under pressure in a third chamber for preventing steam leaking past said supply valve means becoming effective in said turbine, said intercepting means being rendered ineffective upon release of fluid under pressure from said third chamber, and means connecting said third chamber to said second chamber for rendering said intercepting means operable in accordance with the pressure of fluid in said second chamber.

3. A control apparatus for a steam turbine comprising a steam supply pipe for said turbine, steam supply valve means for supplying steam to and for cutting off the supply of steam to said pipe, a fluid motor comprising power means for controlling said supply valve means and operable upon supply of fluid under pressure to one chamber when fluid under pressure is released from a second chamber to effect operation of said supply valve means to supply steam to said pipe and operable upon supply of fluid under pressure to said second chamber when fluid under pressure is released from said one chamber to effect operation of said valve means to cut off supply of steam to said pipe, control means for selectively supplying fluid under pressure to either one of said chambers and for at the same time releasing fluid under pressure from the other chamber, a vent for releasing fluid under pressure from said pipe, a vent valve for opening and closing said vent, power means subject to pressure of fluid in said second chamber and operable upon supply of fluid under pressure thereto to effect operation of said vent valve to open said vent, and means operable upon release of fluid under pressure from said second chamber to effect operation of said vent valve to close said vent.

4. A control apparatus for a steam turbine comprising a steam supply pipe for said turbine, steam supply valve means for supplying steam to and for cutting off the supply of steam to said pipe, a fluid motor comprising power means for controlling said supply valve means and operable upon supply of fluid under pressure to one chamber when fluid under pressure is released from a second chamber to effect operation of said supply valve means to supply steam to said pipe and operable upon supply of fluid under pressure to said second chamber when fluid under pressure is released from said one chamber to effect operation of said valve means to cut off supply of steam to said pipe, control means for selectively supplying fluid under pressure to either one of said chambers and for at the same time releasing fluid under pressure from the other chamber, a valve for controlling communication through said pipe, power means operable by fluid under pressure to actuate said valve to close said communication, means operable upon release of fluid under pressure on said power means to actuate said valve to open said communication, and means subjecting said power means to pressure of fluid in said second chamber.

5. A control apparatus for a steam turbine comprising a steam supply pipe for said turbine, steam supply valve means for supplying steam to and for cutting off the supply of steam to said pipe, a fluid motor comprising power means for controlling said supply valve means and operable upon supply of fluid under pressure to one chamber when fluid under pressure is released from a second chamber to effect operation of said supply valve means to supply steam to said pipe and operable upon supply of fluid under pressure to said second chamber when fluid under pressure is released from said one chamber to effect operation of said valve means to cut off supply of steam to said pipe, control means for selectively supplying fluid under pressure to either one of said chambers and for at the same time releasing fluid under pressure from the other chamber, intercepting valve means controlling communication through said pipe and controlling a vent from said pipe for dissipating from said pipe steam leakage past said supply valve means, power means for controlling said intercepting valve means and operable by fluid under pressure to effect operation of said intercepting valve means to close said communication and to open said vent, means operable upon release of fluid under pressure from said power means to effect operation of said intercepting valve means to open said communication and to close said vent, and means subjecting said power means to pressure of fluid in said second chamber.

ELLIS E. HEWITT.

REFERENCES CITED

The following references are of record in the file of this patent:

UNITED STATES PATENTS

| Number | Name | Date |
|---|---|---|
| 741,261 | Ledermann | Oct. 31, 1903 |
| 1,521,724 | Sour | Jan. 6, 1925 |
| 1,690,093 | Allen | Nov. 6, 1928 |
| 1,931,104 | Caughey | Oct. 17, 1933 |
| 2,294,753 | Hedman | Sept. 1, 1942 |